Figure 1:
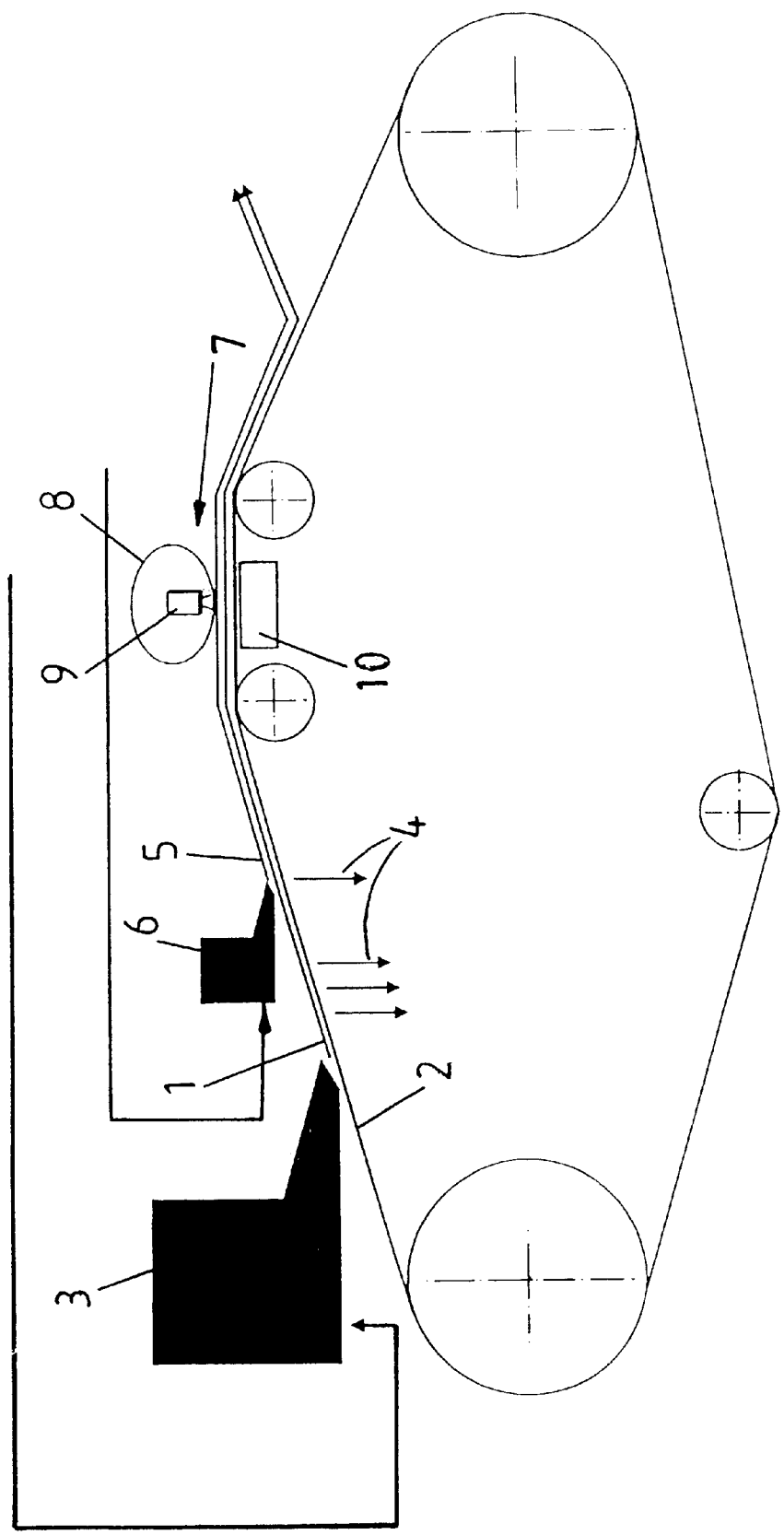

United States Patent [19]
Gbur et al.

[11] Patent Number: 6,139,883
[45] Date of Patent: Oct. 31, 2000

[54] POROUS WEB MATERIAL

[75] Inventors: Ivan Gbur, Lancashire; Brian Tomkinson, Bolton; Joyce Alston, Lancashire, all of United Kingdom

[73] Assignee: J. R. Crompton Limited, Lancashire, United Kingdom

[21] Appl. No.: 08/983,378

[22] PCT Filed: Jul. 29, 1996

[86] PCT No.: PCT/GB96/01839

§ 371 Date: Apr. 28, 1998

§ 102(e) Date: Apr. 28, 1998

[87] PCT Pub. No.: WO97/04956

PCT Pub. Date: Feb. 13, 1997

[30] Foreign Application Priority Data

Jul. 29, 1995 [GB] United Kingdom .................. 9515617
Nov. 13, 1995 [GB] United Kingdom .................. 9523162

[51] Int. Cl.[7] .............................. B65B 29/02; B32B 7/02; D21H 27/38
[52] U.S. Cl. ................................ 426/77; 426/79; 426/84; 428/316.6; 162/91; 162/98; 162/141; 162/213
[58] Field of Search ................................. 426/77, 79, 84; 428/316.6; 162/91, 98, 141, 213

[56] References Cited

U.S. PATENT DOCUMENTS

| 2,531,594 | 11/1950 | Abrahams | 426/84 |
|---|---|---|---|
| 2,928,765 | 3/1960 | Kurjan | 426/84 |
| 3,386,834 | 6/1968 | Noiset et al. | 426/84 |
| 3,529,925 | 9/1970 | Thomas et al. | 426/77 |
| 3,640,727 | 2/1972 | Heusinkveld | 426/77 |
| 4,582,666 | 4/1986 | Kenworty et al. | 264/557 |
| 4,801,464 | 1/1989 | Hubbard, Jr. | 426/79 |
| 5,288,402 | 2/1994 | Yoshida | 210/488 |
| 5,443,606 | 8/1995 | Hassenboehler, Jr. et al. | 55/486 |
| 5,496,573 | 3/1996 | Tsuji et al. | 426/84 |
| 5,500,167 | 3/1996 | Degen | 264/41 |
| 5,780,369 | 7/1998 | Allison et al. | 442/384 |

FOREIGN PATENT DOCUMENTS

| 651488 | 10/1962 | Canada . |
|---|---|---|
| 615921 | 9/1994 | European Pat. Off. . |
| 26 36 486 | 2/1978 | Germany . |
| 9709167 | 3/1997 | WIPO . |

Primary Examiner—Nina Bhat
Attorney, Agent, or Firm—Woodard, Emhardt, Naughton, Moriarty & McNett

[57] ABSTRACT

A fibrous, porous web material of the non-heat seal tissue having a basis weight of 9–18 gm-2 and comprises a first layer and a second layer juxtaposed thereto wherein the second layer. The first layer comprising vegetable fibers and a second layer comprising hardwood fibers, the second layer has a smaller pore size than the first layer. The paper is useful for producing beverage infusion bags (e.g. teabags) from which there is minimal passage of fine particles from the bags into their packaging.

33 Claims, 1 Drawing Sheet

POROUS WEB MATERIAL

This application claims the benefit of national stage application PCT/GB96/01839, filed Jul. 29, 1996.

The present invention relates to a fibrous, porous web material of the non-heat seal type intended for use particularly, but not exclusively, for the production of infusion sachets for brewing beverages such as tea and coffee.

Infusion sachets for brewing beverages (e.g. so called teabags and coffee bags) are generally produced from either "heat seal" or "non-heat seal" fibrous porous web material (hereinafter also referred to as paper for convenience). Heat seal paper generally comprises two layers. One of these two layers includes fusible polymeric fibres which allow two layers of the paper to be heat sealed together in the production of infusion bags. The other layer is present as an insulation layer to prevent polymer (in the other layer) sticking to heated dies during conversion of the paper to produce an infusion sachet. In contrast, a non-heat seal paper (which normally has a basis weight in the range of 9 to 18 g m$^{-2}$ and typically about 12.3 g m$^{-2}$) is generally comprised of a single layer comprised of vegetable fibres which does not incorporate fusible polymeric fibres. Thus, as its name suggests, non-heat seal paper cannot be heat sealed to itself. Infusion bags are produced from such paper by crimping or otherwise mechanically securing two layers of the paper together.

There is however a problem in some areas with conventional non-heat seal papers for use in the production of teabags in that fine tea dust (resulting from interaction of tea leaves during processing thereof) or fine particles of tea have a tendency to pass through the paper to the outside of the teabag. Since teabags are generally packaged in boxes or other types of "outer" packaging, the fine tea particles or dust are "loose" in the packaging and this is undesirable from the aesthetic viewpoint.

One possibility for overcoming this problem would be to increase the percentage of finer fibres (preferably hardwood fibres) in the stock from which the single ply paper is produced. This would result in a paper with smaller pores thus reducing the amount of fine tea or tea dust which can pass through the paper.

The increase of hardwood fibres or other short fibres in the single layer to achieve the required pore size distribution would, however, affect overall paper strength to the extent that the paper would not have sufficient strength for manufacture into infusion bags. A further disadvantage which would be associated with the use of hardwood fibres in the layer would be the incidence of pin-hole generation through air entrainment.

A further disadvantage of conventional non-heat sealpaper is that it is difficult to provide a pattern in the paper using conventional methods. The patterns which are desired are those which can readily be produced in papers of the "heat seal" type. Such patterns may comprise a matrix of perforations which are formed through the web and which are intended to allow the passage of water therethrough. Alternatively the pattern may be either a logo or other marking indicating the manufacture of either the paper or infusion sachets prepared therefrom.

Such perforations are generally formed in heat seal paper by one of two methods. Firstly the perforations may be formed by a pattern of projections (known as knuckles) on the wire on which the fibrous suspension (used for producing the paper) is produced during the "wet laying" operation. Secondly the pattern may be formed in the web by fluid jets, e.g. using a PERFOJET apparatus.

Non-heat seal paper is generally comprised of a single layer (as indicated above) and typically has a basis weight of 12.3 g m$^{-2}$. The patterning methods discussed above cannot generally be used for such non-heat seal paper. Thus, if the paper is formed on a wire provided with knuckles, the paper cannot be easily released from the wire. This is believed to be due to the fact that the cellulosic fibres of the paper are more cohesive because of their greater contact with the wire and their wetness (and as such are therefore more difficult to release) than the cylindrical synthetic fibres in heat seal paper. If a liquid jet is used to pattern such a non-heat seal paper, the resultant material is too "open" as the jet would 'strike through' the single layer and would allow beverage precursor material (e.g. tea leaves) to pass through the paper.

It is therefore an object of the present invention to obviate or mitigate the above mentioned disadvantages.

According to the first aspect of the present invention there is provided a fibrous, porous web material of the non-heat seal type having a basis weight of 9 to 18 g m$^{-2}$ and comprising a first layer and a second layer juxtaposed thereto wherein the second layer has a smaller pore size then the first layer.

According to the second aspect of the present invention there is provided a beverage infusion bag comprising a beverage precursor material enclosed within a sachet formed of a material in accordance with the first aspect of the invention.

In the web material of the first aspect of the invention, the second layer has a smaller pore size than the first layer. The material is such that it is capable of preventing or inhibiting passage therethrough of fine particles of a beverage precursor material (e.g. tea leaves) and such that it has the required strength for conversion to beverage infusion bags. The invention thus provides a non-heat seal paper which may be converted to tea bags from which there is minimal passage of fine particles from bags into their packaging.

Obviously the reduction in porosity as provided by the second layer is not so high as to prevent passage of water through the material during infusion of the beverage.

The material of the invention also has the advantage that it may be patterned by means of a fluid jet, as detailed more fully below.

The material of the invention preferably has a basis weight of 9 to 15 g m$^{-2}$, more preferably 9 to 14 g m$^{-2}$, even more preferably 11 to 13 g m$^{-2}$, and most preferably 12 to 13 g m$^{-2}$. Typically the basis weight will be 12.3 to 12.4 gm$^{-2}$.

The material of the invention may be produced in accordance with a third aspect of the invention by wet laying the first layer and, whilst draining water therefrom, laying the second layer on top of the first layer. This "two stage" production method has an advantage in that any voids in the first layer caused by air-entrainment will be filled (as a result of drainage through the voids) by the fibres of the second layer. Thus the size of the voids is reduced, contributing to the overall reduced porosity of the web. There is the further advantage of the "two stage" process in that for a material of a particular basis weight it allows an increased speed of production as compared to the production of a single layer material of the same basis weight.

The second layer may be produced in a number of ways to ensure that it has a pore size lower than the first layer. In a preferred embodiment of the invention, the second layer is produced from fibres (e.g. hardwood fibres) which are shorter and finer than the fibres (e.g. vegetable fibres) of the first layer. Alternatively, it is possible for the second layer to comprise fibres which are coarser than those of the first layer and to be used in an amount such as to provide a highly tortuous path along which a particle would need to pass to traverse the second layer. It is this highly tortuous path which provides the required small pore size.

As indicated, it is preferred that the majority of the fibres from which the second layer is formed have a mean cross-sectional size and/or length less than those of the first layer.

Preferably the fibres in the second layer provide 10 to 50% by weight of the total weight of the web material. In a preferred material in accordance with the invention, the first layer comprises vegetable fibres and the second layer comprises hardwood fibres.

The hardwood fibres of the second layer may for example comprise 10% to 50%, preferably 20% to 40%, by weight of the total weight of the web material. The hardwood fibres preferably have a length of 0.4 mm to 2.5 mm and may for example have a mean length of about 0.8 mm. The fibre width may be 10 to 25 $\mu$m with a mean of about 14 $\mu$m. Hardwood fibres are finer and shorter than softwood fibres. Examples of hardwood fibres which may be used include birch, beech and eucalypt. If desired, the second layer may comprise of Softwood, Sisal and/or Jute or man made fibres as part of the fibre components of the layer.

Although it is preferred that the second layer comprises hardwood fibres, it is possible for the second layer to be comprised of other fibre types.

Preferably the vegetable fibres of the first layer provide 50% to 90%, more preferably 50% to 70%, by weight of the web material. These fibres will generally have a length of 0.8 mm to 9 mm and may for example have a mean length of about 4.3 mm. A suitable vegetable fibre is Manila (Abaca).

If desired, the first layer may comprise Sisal and/or Jute as part of the vegetable fibre component of the layer. It may also be possible to produce a similar material with man made fibres, although the preferred way would be as described above.

If desired, a proportion of the vegetable fibres of the first layer may be replaced by softwood fibres. Preferably the amount of softwood fibres does not exceed 75% by weight of the first layer. Softwood fibres are long, flat ribbon-like fibres which are readily distinguished by a person skilled in the art from vegetable fibres and hardwood fibres. The softwood fibres may have a length of 0.8 mm to 5 mm and a width of 12 to 60 $\mu$m. Typical means of these values are 3.8 mm and 29 microns respectively. The softwood fibres may for example be obtained from spruce, pine, cedar, western hemlock, fir or redwood.

It is preferred that the web material of the invention has a thickness in the range of 30–100 $\mu$m more typically in the region of 40–60 $\mu$m.

It should be appreciated that the invention also covers papers comprising three or more layers. Thus, it is possible in accordance with the invention to produce a paper having a central layer comprised of softwood fibres sandwiched between an outer layer comprised of Manila fibres and another outer layer comprised of hardwood fibres. The layer comprised of hardwood fibres would have the smallest pore size whereas the layer comprised of Manila fibres may have a larger pore size than the layer comprised of softwood fibres or vice versa. This construction may be modified so that the layer comprised of Manila fibres is the central layer and the layer comprised of softwood fibres forms an outer layer.

As indicated above, the material in accordance with the invention may be patterned by means of fluid jets during the paper forming step on the papermaking fabric or wire.

If the material comprises only two layers and the fibres of the second layer are shorter and finer than those of the first layer then the pattern is formed in the second layer of the material, i.e. that layer having the smaller pores. This is an important feature since the shorter fibres (of the second layer) provide good pattern definition because of their lower cohesiveness and greater ease of movement than the longer fibres of the first layer which provide strength during processing.

The ability to provide patterns in non-heat seal papers is an important aspect of the present invention in its own right and therefore in accordance with a fourth aspect of the invention there is provided a method of producing a patterned paper of the non-heat seal type comprising wet laying a first fibrous layer and subsequently a second layer thereon, and forming a pattern in the wet laid web during the paper forming step whilst the web is on the papermaking fabric or wire by means of fluid jets.

The fluid jets are preferably liquid jets, e.g. water jets. The pattern may be formed whilst the paper is on the wire by means of a patterning station which is comprised of a rotary hollow cylinder having perforations (defining the required pattern) in the wall thereof and means for directing a fluid radially outwardly through the perforations in the cylinder to form the pattern in the web. The liquid pressure is preferably 100–800 kPa (1–8 bar), more preferably 300–400 kPa (3–4 bar). The pattern may be formed using a PERFOJET apparatus.

A method of producing a web material in accordance with the invention will be described with reference to the accompanying drawing.

The web material is formed from two fibrous stocks. One stock (for forming the first layer) comprises vegetable-fibres (and optionally other fibre types, e.g. softwood fibres) and the other stock (for forming the second layer) comprises hardwood fibres (and optionally other fibre types).

Typically the process for production of this paper is as follows:

As shown in the drawing, the stock for forming the first layer 1 is laid onto a continuously moving paper forming fabric 2 from a head box 3. Water is withdrawn as shown by the arrows 4 and the second layer 5 is subsequently laid down from a further head box 6.

A pattern is formed at a patterning station 7 comprised of a rotary perforated cylinder 8 within which is located a spray-head 9 for providing liquid (preferably water) jets, which are directed through the perforations in cylinder 8. It is these perforations which provide the desired pattern. A suction box 10 serves to remove water from the web.

The liquid jet pressure is preferably 3–4 bars which causes perforations to be formed in the layer 2. There is no substantial perforation of layer 1.

Layer 5 is the one having the smaller pore size and is formed from shorter fibres than used for layer 1.

The web may be passed around steam heat drying cylinders (not shown) or other drying means (e.g. gas heated through dryers) and may be subjected to further impregnation with additive at a size press (not shown). Wet or dry strength agents may be added either in the head box or the size press.

Other machine configurations could also be used.

Papers having the three layer construction may be produced using an apparatus of the type illustrated in the drawing modified by the inclusion of a third head box.

The invention is illustrated by the following non-limiting Example.

EXAMPLE

A paper having a basis weight of 12.3 g m$^{-2}$ was prepared using the procedure shown in the drawing by wet laying a first (base) layer of vegetable fibres combined with softwood and a second (top) layer of hardwood fibres which comprised 25% by weight of the total weight of the material.

Tests were conducted on the material obtained to determine how effective it was at preventing the percolation therethrough of fine sand. The sand dust percolation was determined as the percent by weight of a sample of sand having a particle size in the range 106–150 μm which would pass through the paper in a standard test which involves vibrating a horizontally disposed sample of the paper on which the sand is located.

As a result of the test, less than 10% of the sand was found to have passed through the papers. This compares with a value of 35–50% obtained using a conventional non-heat seal paper sold in the industry.

Thus the material of the invention is superior to prior art materials for use in producing beverage infusion bags (e.g. tea bags) to prevent dust therein passing outwardly through the paper.

We claim:

1. A fibrous, porous web of non-heat seal tissue having a basis weight of 9 to 18 g m$^{-2}$ and comprising a first layer comprising vegetable fibres and a second layer comprising hardwood fibres juxtaposed thereto wherein the second layer has a smaller pore size than the first layer.

2. A method as claimed in claim 1 having a basis weight of 9 to 15 g m$^{-2}$.

3. A material as claimed in claim 2 having a basis weight of 9 to 14 g m$^{-2}$.

4. A material as claimed in claim 3 having a basis weight of 11 to 13 g m$^{-2}$.

5. A material as claimed in claim 4 having a basis weight of 12 to 13 g m$^{-2}$.

6. A material as claimed in claim 1 wherein the majority of the fibres of the second layer are finer than the majority of the fibres of the first layer.

7. A material as claimed in claim 1 wherein the first layer comprises vegetable fibres in an amount to provide 50% to 90% by weight of the web material.

8. A material as claimed in claim 7 wherein the vegetable fibres of the first layer provide 50% to 70% by weight of the web material.

9. A material as claimed in claim 1 wherein the vegetable fibres have a length of 0.8 mm to 9 mm.

10. A material as claimed in claim 1 wherein the vegetable fibre is Manila.

11. A material as claimed in claim 1 wherein the first layer also incorporates softwood fibres.

12. A material as claimed in claim 11 wherein the softwood fibres have a length of 0.8 mm to 6 mm.

13. A material as claimed in claim 11 wherein the softwood fibres are of spruce, pine, cedar, western hemlock, fir or redwood.

14. A material as claimed in claim 1 wherein the hardwood fibres have a length of 0.4 mm to 2.5 mm.

15. A material as claimed in claim 1 wherein the hardwood fibres are of birch, beech or eucalypt.

16. A material as claimed in claim 1 wherein the hardwood fibres of the second layer comprise 10% to 50% by weight of the total weight of the web material.

17. A material as claimed in claim 16 wherein the hardwood fibres of the second layer comprise 20% to 40% by weight of the total weight of the web material.

18. A material as claimed in claim 1 which comprises three or more layers.

19. A material as claimed in claim 1 having a thickness of less than 100 micrcons.

20. A material as claimed in claim 1 wherein a layer of the material has a pattern formed therein by means of fluid jets.

21. A material as claimed in claim 20 comprised of two layers and wherein the pattern is formed in the layer having the smaller pore size.

22. A material as claimed in claim 21 comprised of three or more layers and wherein the pattern is formed in either of the outer layers.

23. A beverage infusion bag comprising a beverage precursor material enclosed within a sachet formed of a material as claimed in claim 1.

24. A method of producing a material as claimed in claim 1 wherein the layers are successively wet-laid onto a paper-forming fabric or wire.

25. A method as claimed in claim 24 wherein water is withdrawn from the first layer prior to laying the second layer.

26. A method as claimed in claim 24 additionally comprising the step of forming a pattern in one of the layers by means of fluid jets.

27. A method as claimed in claim 26 wherein the pattern is formed whilst the paper is on the wire by means of a patterning station which is comprised of a rotary hollow cylinder having perforations defining the required pattern in the wall thereof and means for directing a fluid radially outwardly through the perforations in the cylinder to form the pattern in the web.

28. A method as claimed in claim 26 wherein title fluid is liquid.

29. A method as claimed in claim 28 wherein the liquid pressure is 100 to 800 kPa (1 to 8 bars).

30. A method as claimed in claim 29 wherein the liquid pressure is 300 to 400 kPa (3 to 4 bars).

31. A method of producing a patterned paper of non-heat seal tissue comprising wet laying a first fibrous layer and subsequently a second layer thereon, and forming a pattern in the wet laid web during the paper forming step whilst the web is on the papermaking fabric or wire by means of fluid by means of fluid jets.

32. A method as claimed in claim 31 wherein water is withdrawn from the first layer prior to laying the second layer.

33. A method as claimed in claim 31 in which the first layer comprises vegetable fibres and the second layer comprises hardwood fibres.

* * * * *

UNITED STATES PATENT AND TRADEMARK OFFICE
CERTIFICATE OF CORRECTION

PATENT NO.      : 6,139,883
DATED           : October 31, 2000
INVENTOR(S)     : Gbur et al.

Page 1 of 1

It is certified that error appears in the above-identified patent and that said Letters Patent is hereby corrected as shown below:

Column 2,
Between lines 27 and 28 add the following:
-- <u>Brief Description of the Drawings</u>
    Figure 1 depicts a diagram of a system useful in preparing a layered fibrous porous web of the present invention. --.

Column 5,
Line 21, delete the words "fibrous, porous web" and replace with -- fibrous, porous web material --.
Line 26, delete the word "method" and replace with -- material --.

Column 6,
Line 10, delete the word "microns" and replace with -- microns --.
Line 38, delete the word "title" and replace with -- the --.
Lines 48-49, delete the first occurrence of the words "by means of fluid".

Signed and Sealed this

Seventeenth Day of September, 2002

Attest:

JAMES E. ROGAN
*Attesting Officer*                    *Director of the United States Patent and Trademark Office*

UNITED STATES PATENT AND TRADEMARK OFFICE
CERTIFICATE OF CORRECTION

PATENT NO.    : 6,139,883
DATED         : October 31, 2000
INVENTOR(S)   : Gbur et al.

It is certified that error appears in the above-identified patent and that said Letters Patent is hereby corrected as shown below:

Column 2,
Between lines 27 and 28 add the following:
-- Brief Description of the Drawings
      Figure 1 depicts a diagram of a system useful in preparing a layered fibrous porous web of the present invention. --.

Column 5,
Line 21, delete the words "fibrous, porous web" and replace with -- fibrous, porous web material --.
Line 26, delete the word "method" and replace with -- material --.

Column 6,
Line 10, delete the word "micrcons" and replace with -- microns --.
Line 38, delete the word "title" and replace with -- the --.
Lines 48-49, delete the first occurrence of the words "by means of fluid".

This certificate supersedes Certificate of Correction issued September 17, 2002.

Signed and Sealed this

Eleventh Day of March, 2003

JAMES E. ROGAN
*Director of the United States Patent and Trademark Office*